United States Patent [19]
Mongiello, Jr.

[11] Patent Number: 4,541,194
[45] Date of Patent: Sep. 17, 1985

[54] SHARK PROTECTION DEVICE

[76] Inventor: Angelo Mongiello, Jr., 1650 W. 6th St., Brooklyn, N.Y. 11223

[21] Appl. No.: 474,861

[22] Filed: Mar. 14, 1983

[51] Int. Cl.⁴ .................................................. A01K 81/04
[52] U.S. Cl. ...................................................... 43/6
[58] Field of Search ......................... 124/56, 57, 71, 73, 124/74; 43/6, 77; 42/1 L; 89/5

[56] References Cited

U.S. PATENT DOCUMENTS

| | | | |
|---|---|---|---|
| 2,101,762 | 12/1937 | Straub | 124/71 |
| 2,970,399 | 2/1961 | Frohlich et al. | 43/6 |
| 3,300,888 | 1/1967 | Belcher et al. | 42/1 L |
| 3,397,476 | 8/1968 | Weber | 43/6 |
| 4,122,621 | 10/1978 | Barr | 42/1 L |

Primary Examiner—Richard T. Stouffer
Attorney, Agent, or Firm—Paul J. Sutton

[57] ABSTRACT

The present invention provides the swimmer and or diver with protection against a shark. A probe held by the user can be deliberately armed before use. When armed the probe has protruding from its front end a dart. The dart is provided with a trigger restrained from operating by a trigger washer. When the dart is plunged into the shark's body it penetrates the skin and enters the body. The trigger washer no longer restrains the trigger which then allows a gas from a cartridge to enter the shark's body cavity. The gas bloats the shark's body causing the shark to rise in the water having lost the ability to maneuver.

2 Claims, 8 Drawing Figures

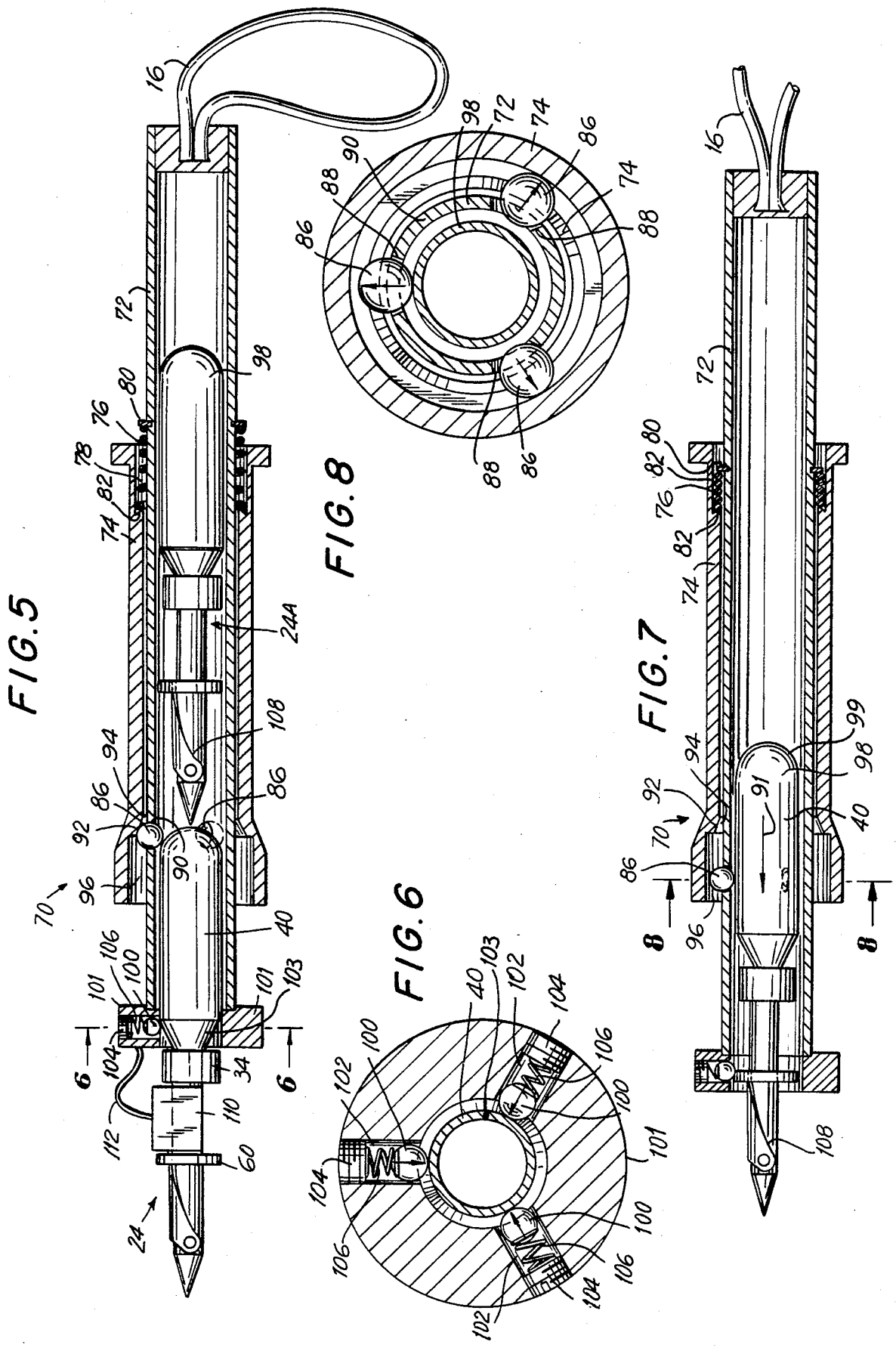

4,541,194

SHARK PROTECTION DEVICE

BACKGROUND OF THE INVENTION

1. Field of the Invention

This invention relates to weapons in general and specifically to weapons used in defense against attack by fish.

2. Prior Art

Defense against attack by sharks has been a problem for as long as man has shared the ocean with the shark. The advent of World War II saw an increase in the research conducted by the armed forces in order to find a defense against sharks. Soldiers, sailors, and airmen who found themselves in the ocean due to an accident needed protection against an attack by a shark. Shark repellent, a chemical substance, had been used as protection against the shark. The efficiency of shark repellent has been in question and other methods of defense have been developed. One of the other methods of defense against sharks is an electric probe which will deliver a shock to the shark. The probe is held by the diver and is under his control. Firearms are another method of defense and are partical above water but not under water. The novelty of the present invention resides in the fact that a shark's buoyancy is, affected when a gas is injected into its body causing the shark to rise in the water. The shark then experiences difficulty in swimming and is no longer interested in the swimmer. The invention also is directed toward producing as small a wound with as little bleeding as possible. Any blood in the water, including the shark's own blood, will further excite the shark.

SUMMARY OF THE INVENTION

An object of the invention is for a swimmer or diver to be provided with protection against attack by a shark.

Another object of this invention is to provide a device which wounds the shark wherein the wound is as small as possible in order to minimize bleeding.

Yet another object of this invention is to provide a means for covering the wound made in the shark, in order to inhibit blood from entering the water.

A further object of this invention is to provide the diver or swimmer with a lightweight protective device.

Still another object of this invention is to provide a device for changing the buoyancy of the shark.

Still yet another object of this invention is to provide a means for attaching the buoyancy altering device to the shark.

BRIEF DESCRIPTION OF THE DRAWINGS

The invention will be better understood from the following description of specific embodiments of the invention, together with accompanying drawings, in which.

FIG. 5 is a sectional side view of another embodiment of the present invention;

FIG. 6 is a view taken through line 6—6 of FIG. 5;

FIG. 7 is a side view of the embodiment shown in FIG. 5 in a withdrawn position; and FIG. 8 is a view taken through line 8—8 of FIG. 7.

DETAILED DESCRIPTION OF THE PREFERRED EMBODIMENT

Figure 1:
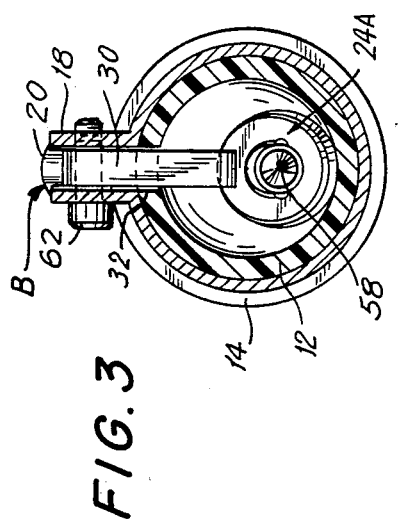
FIG. 1 is a perspective view of the protective gun of the present invention.

Reference is now made to the drawing.

FIG. 1 illustrates a protective device 10 including a cylindrical housing 12 to which is affixed a rear end cap 14, which is provided with a safety cord 16. The opposite end of housing 12 from rear end cap 14 is provided with a lever support bracket 18 which is attached to the housing 12. Pivotally attached to lever support bracket 18 is a rearming lever 20. After use of protective device 10, i.e. after needle 36 is inserted in a shark's body 66 arming lever 20 is moved from an armed position "B" to the alternate rearmed position "A" (shown in phantom). A front end cap assembly 22 is shown attached to housing 12 opposite to rear end cap 14. Protruding from front end cap assembly 22 is a first dart assembly 24.

Figure 2:
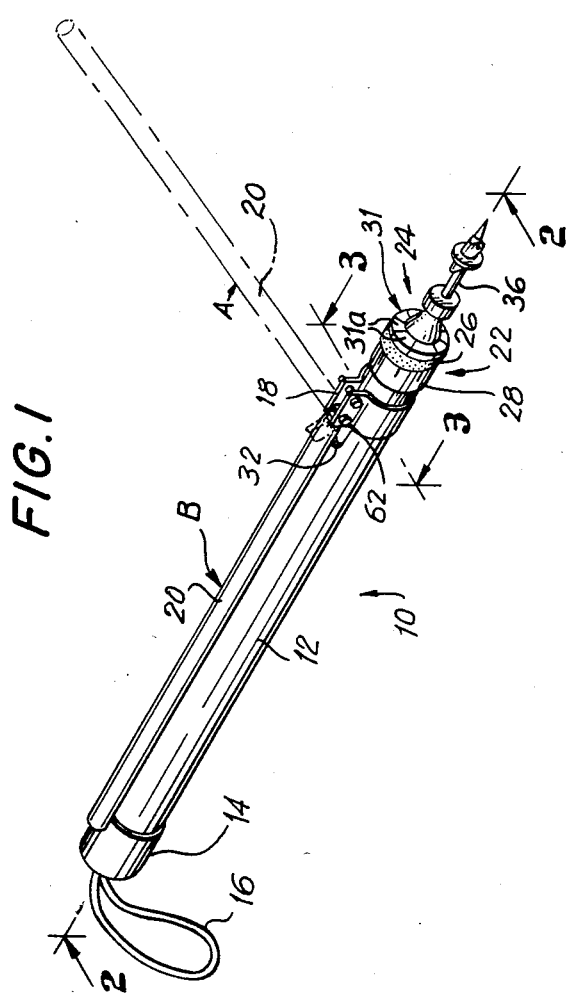
FIG. 2 is a first section taken in the direction of line 2—2 of FIG. 1.

FIG. 2 shows rear end cap 14 attached to housing 12. Safety cord 16 is shown attached to rear end cap 14. The mid portion of housing 12 contains a second dart assembly 24A. Immediately in front of second dart assembly 24A is first dart assembly 24, partially contained within housing 12 and partially protruding from housing 12. First dart assembly 24 is shown pressed against an opening in a retaining cap 26 which is a portion of front end cap assembly 22. A compression "O" ring 28 is positioned around the periphery of the end cap assembly 22. First dart assembly 24 is forced against retaining cap 26 by a cam 30 which abuts the rear portion of first dart assembly 24.

The front portion of first dart assembly 24 which protrudes from the retaining cap 26 is a needle assembly 32, which includes a coupling member 34 having a dart needle 36 integrally attached. Coupling member 34 includes a threaded portion 38 which engages the threaded portion 46 found on the end of a gas cartridge 40. Needle assembly 32 is provided with a probe 42 which enters a throat 44 found in the gas cartridge 40. To ensure a gas tight connection between gas cartridge 40 and coupling member 34 a pressure seal 46 is placed therein.

Dart needle 36 has passage 48 formed within. Passage 48 connects with a side opening 50 in dart needle 36, which opening is blocked by a pressure plug 52 attached to a bail 54. Bail 54 is pivotally attached to the dart needle 36 by a hinge pin 56 which is part of needle assembly 32. Dart needle 36 is shown to be provided with a penetration point 58 for easy entry into the shark. Bail 54 is retained in a rearward position by a trigger washer 60.

FIG. 2 shows lever support bracket 18 clamped to housing 12 by a clamping bolt 19. Arming lever 20 is pivotally attached to support bracket 18 by means of a pivot pin 62 (see FIGS. 2 and 3). Second dart assembly 24A is retained in housing 12 by cam 30 of arming lever 20.

Figures 3, 4:
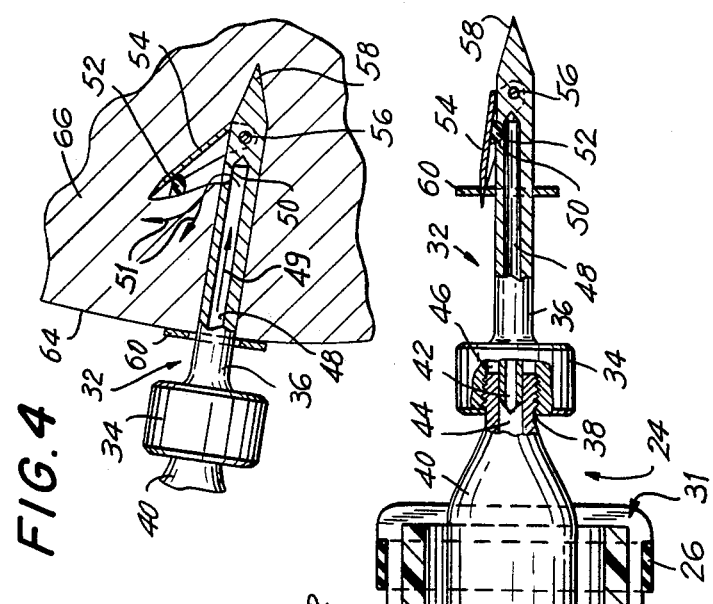
FIG. 3 is second section taken in the direction of line 3—3 of FIG. 1.
FIG. 4 is a portion of the protective gun of FIG. 1 showing the dart assembly in the body of the shark.

FIG.4 shows needle assembly 32 having entered the shark's body 66. Also shown are gas cartridge 40, coupling member 34 and dart needle 36. Needle assembly 32 has punctured a shark's skin 64 and imbedded itself in the shark's body 66. Trigger washer 60 is shown abuting the shark's skin 64. Also shown in bail 54, which has moved away from its restrained position as shown in FIG. 2. Further, pressure plug 52 has uncovered the side opening 50 allowing the pressured gas/(shown by the arrows) to enter the shark's body 66.

The present invention will be better understood when the following description of its operation is taken in conjunction with the foregoing description of the drawings.

The general appearance of the protective device 10 is best seen in FIG. 1. The protective device 10 is provided with safety cord 16, which is worn on the user's wrist. Safety cord 16 secures protective device 10 from loss should the user lose hold of housing 12. Safety cord 16 also enables the user to simply suspend protective device 10 from the wrist when device 10 is not in use.

FIG. 1 shows protective device 10 readied for use (position B). The user holds housing 12 in the manner of a flashlight and thrusts the first dart assembly 24 into the shark's body 66. When dart assembly 24 has entered the shark's body 66, it becomes captive, and as either the shark or the user moves away, first dart assembly 24 is drawn out of front end cap assembly 22 of device 10.

In order to rearm protective device 10, arming lever 20 is moved to position "A" (shown in phantom) and housing 12 is held vertically with front end cap assembly 22 facing downward. Under these conditions second dart assembly 24A is allowed to occupy the space formally occupied by first dart assembly 24. Since the opening in front end cap assembly 22 is smaller than the maximum diameter of gas cartridge 40, the return of arming lever 20 to its original position "B" parallel to housing 12 causes cam 30 to push gas cartridge 40 against front end cap assembly 22. The movement of arming lever 20 to rearming position "A" also allows cam 30 to clear a storage space in the interior of housing 12 permitting second dart assembly 24A to advance to the above-mentioned loaded position.

As shown in the perspective of FIG. 1, an annular cap 31 having resilient fingers 31a surround the opening at the front of end cap assembly 22. Annular cap 31 presses upon the front surface of gas cartridge 40 of first dart assembly 24 and acts to retain the cartridge in housing 12. When first dart assembly 24 is fired into the shark, cartridge 40 is withdrawn from the housing 12 by the needle 36.

FIG. 3 shows cam 30 in its downward position preventing second dart assembly 24A from leaving the storage portion of the housing 12.

FIG. 2 shows details of needle assembly 32 which is provided with coupling member 34 including threaded portion 38, which engages the similarly threaded portion of gas cartridge 40. Further, coupling member 38 includes probe 42, which is adapted to puncture the gastight seal found across throat 44 of gas cartridge 40. The interior of coupling member 34 is provided with a pressure seal 46 which, when coupling member 34 is properly tightened, will prevent the contents of gas cartridge 40 from leaking out through coupling member 34.

Extending from coupling member 34 is dart needle 36, which is provided with internal passage 48 for flow (arrow 49, FIG. 4) of the contents of gas cartridge 40 to side opening 50.

Before first dart assembly 24 is used, side opening 50 is sealed by pressure plug 52. Pressure plug 52 is pushed into side opening 50 by the position of bail 54, which is kept in the closed position by trigger washer 60.

When armed dart assembly 24 has been used to puncture the shark's skin 64 as shown in FIG. 4, the following sequence of events occur. Penetration point 58 being sharpened allows for easy penetration of the shark's skin 64. Dart needle 36 continues to enter the shark's body 66 being driven by the user's arm. Trigger washer 60 abuts the shark's skin 64, which causes trigger washer 60 to release bail 54. When bail 54 is released, the gas pressure in gas cartridge 40 forces pressure plug 52 away from side opening 50. The gas from gas cartridge 40 is now forced to flow through passage 48 (arrow 49) into the shark's body 66, as depicted by the arrows 51 in FIG. 4. The foregoing sequence of occurrences serves two functions; first, trigger washer 60 covers the entrance to the wound in the shark's body, thereby preventing or reducing the escape of the shark's blood into the water; and second, it helps seal the wound so the gas from gas cartridge 40 will not escape from the shark's body 66. Reducting the amount of blood escaping into the water reduces the risk of attracting other sharks. The gas which enters (arrows 51) the shark's body 66 affects the shark's equilibrium, and causes it to become more buoyant. This results in disorienting the shark, with the further result that the shark is prevented from attacking.

An alternate embodiment of the invention is illustrated in FIGS. 5, 6, 7, and 8. In particular, FIG. 5 illustrates the alternate embodiment, designated as device 70, including the same first and second dart assemblies 24 and 24A, respectively, held in position in a hollow cylindrical housing 72 in a manner to be hereinafter described.

A cylindrical shell 74 is slidably mounted around the mid-area of housing 72. Shell 74 is moveable between a forward and a rearward position. The forward position is shown in FIG. 5 and is the position usually taken by shell 74. The rearward position of shell 74 is shown in FIG. 7, where it is disposed against a fully cocked expansion spring 76 disposed between the rear end portion of shell 74 and the outer surface of housing 72 in cavity 78 formed by shell 74. Spring 76 is compressed between a forward wall 82 of cavity 78 and a circular base 80 connected to the outer surface of housing 72 rearward of shell 74. Preferably at least three balls 86 (FIG. 8) are mounted at regular 120 degree intervals in three mounting holes 88 extending through the wall 90 of housing 72. Balls 86 are retained in the holes 88 because of the sloped sides of holes 88 that create exit apertures slightly smaller than the diameter of the balls 86. The entering apertures are slightly larger than the diameter of the balls 86. Balls 86 extend far enough through holes 88 to seat behind gas cartridge 40 of first dart assembly 24. In the forward position of shell 74 as shown in FIG. 5, expansion spring 76 is partly cocked, with the result that balls 86 are pressed into holes 88 by a forwardly sloped locking jamb 92 formed around the inner surface of the forward portion of shell 74. Circumferential chamber 94 is formed between jamb 92 and the outer surface of housing 72, with chamber 94 adjoining each of holes 88 when the shell is in its forward position. Jamb 92 presses balls 86 against the rear surface area of gas cartridge 40 of first dart assembly 24 with the result that first dart assembly 24 is held in its forward mode with its needle 36 positioned beyond the forward end of housing 72.

FIG. 7 illustrates the position of shell 74 after first dart assembly 24 has been fired and second dart assembly 24A is in the process of being moved forward (arrow 91) into the position vacated by first dart assembly 24. When shell 74 has been pulled back by the user into its cocked mode, as also shown in FIG. 8, balls 86 are freed from their locked position, previously caused by locking jamb 92. The balls are now free to extend outwardly from holes 88 into cylindrical end chamber 96 formed in shell 74 at its forward end. Balls 86 are pressed outwardly from holes 88 by the outer side surface 98 of gas cartridge 40 of second dart assembly 24A, as the assembly 24A moves forward (arrow 91) to an action mode. Second dart assembly 24A is continued on its forward movement until the end wall 99 of its gas cartridge 40 arrives at balls 86 and the balls drop through holes 88 around the end wall 99 of the gas cartridge 40. Thereupon cocked shell 74 is released and is forced forward to its partly biased forward position. Locking jamb 92 forces balls 88 into pressured contact with the rear wall 99 of gas cartridge 40, thus holding second dart assembly 24A forward in its action, or ready, mode.

FIG. 6 also illustrates three detent balls 100 positioned in cylindrical channels 102 formed in three housing member 101. Balls 100 are set at regular 120 degree intervals around the front end portion of housing 72. Channels 102 are radially directed and extend from the inner surface of the interior cylindrical hollow of housing 72 to a point above the outer surface of housing 72. Channels 102 are blind with their outer portions having cross-walls that act as biasing bases 104 for three inner biasing expansion springs 106 positioned in channels 102 between detent balls 100 and bases 104. Springs 100 and detent balls 100 are connected. Springs 106 are partly cocked as shown in FIG. 6 and bias detent balls 100 against the front wall 103 of cartridge 40 of first dart assembly 24, which action holds first dart assembly 24 within the inner hollow cylinder of housing 72. After first dart assembly 24 has been fired, cylinder 40 is pulled, either during the firing or by hand, from housing 72 to make room for second dart assembly 24A. With this movement, detent balls 100 are pressed outwardly in channels 102 and cause springs 106 to bias to a fully cocked position. Upon complete removal of cartridge 40, detent balls 100 are biased inwardly once again. As second dart needle 108 passes between detent balls 100, they are temporarily biased upwardly by trigger washer 60 and then released. Detent balls 100 finally assume the same positions as before except that upon rearming they act to hold the second dart assembly 24A in place by locking against the second gas cartridge 40.

Also shown in FIG. 5 is a resilient safety snap 110 that is adapted to be snapped over needle 36 between trigger washer 60 and coupling member 34 of the dart assembly 24. Safety snap 110 acts as a clamp and includes a cylindrical outer wall interrupted by an opening which is pressed onto needle 36 as its resilient sides snap open and then resiliently close around the needle. A tether line 112 attaches snap 110 to housing 72, preferably at the outside of one of the channels 104.

The materials used in the construction of this invention may be many and varied and in no way affect the principles of the present invention.

The embodiment of the invention particularly discussed and described hereinabove is presented merely as an example of the invention. Other embodiments and modifications of the invention coming within the proper scope and spirit of the appended claims, will of course, readily suggest themselves to those skilled in the art.

What is claimed is:

1. A protective device comprising:
   a housing having a plurality of holes, an interior of storage space and front and rear ends, said front end having an opening to said interior storage space,
   a safety cord attached to said housing,
   a plurality of sequentially arranged dart assemblies disposed in said interior storage space of said housing, each of said assemblies being provided with storing means for storing compressed gas, a first one of said sequentially arranged dart assemblies being positioned proximate to said front end of said housing, said first dart assembly having a protruding portion extending beyond said front end of said housing,
   each of said dart assemblies including a hollow needle affixed to its respective one of said storing means, said needle including a seal for sealing said gas within said needle and said storing means, and means for breaking said seal to release said gas into a shark when said needle is plunged into said shark,
   a cap disposed on one end of said housing, said cap providing resistance to the removal of a dart assembly from said housing,
   a shell surrounding said housing, said shell being movable between forward and rearward positions,
   a plurality of locking balls disposed in said holes in said housing between said shell and said housing, and
   means for biasing said shell towards said forward position, said shell pressing said balls against a rear surface of said gas storing means for said first dart assembly in said forward position, said first dart assembly being held in position by said balls at said front end of said housing, said shell removing pressure against said balls in said rearward position whereby said balls are free to pass outwardly from said holes, and a second of said sequentially arranged dart assemblies is free to move to a forward position in said housing upon said first dart assembly being drawn out of said housing.

2. The protective device of claim 1, further including a plurality of members positioned at regular intervals around an outer surface of said housing at said front end, each of said members having a channel extending radially inwards and having an opening into said interior storage space, a detent ball positioned in each of said channels at said opening, and means positioned in each of said channels for biasing each said detent ball, each of said detent balls being movable between a withdrawn and an engaged positioned, each said detent ball extends into said interior storage space in said engaged position and contacts with a front wall of said gas storing means, whereby said dart assembly is kept in position within said housing, and said detent ball is positioned in said channel in said withdrawn position.

* * * * *